(12) United States Patent
Cheung et al.

(10) Patent No.: US 7,388,962 B2
(45) Date of Patent: Jun. 17, 2008

(54) DIRECTIONAL HEARING ENHANCEMENT SYSTEMS

(75) Inventors: Kwok Wai Cheung, Hong Kong (CN); Peter P. Tong, Mountain View, CA (US); C. Douglass Thomas, Campbell, CA (US)

(73) Assignee: IpVenture, Inc., Los Altos, CA (US)

( * ) Notice: Subject to any disclaimer, the term of this patent is extended or adjusted under 35 U.S.C. 154(b) by 722 days.

(21) Appl. No.: 10/826,527

(22) Filed: Apr. 15, 2004

(65) Prior Publication Data

US 2004/0208333 A1 Oct. 21, 2004

Related U.S. Application Data

(60) Provisional application No. 60/493,441, filed on Aug. 8, 2003, provisional application No. 60/469,221, filed on May 12, 2003, provisional application No. 60/462,570, filed on Apr. 15, 2003.

(51) Int. Cl.
*H04R 25/00* (2006.01)
*H04M 1/00* (2006.01)
*H04B 1/10* (2006.01)

(52) U.S. Cl. .................... 381/381; 381/55; 381/313; 381/320; 381/189; 381/373; 379/412; 455/308

(58) Field of Classification Search ........ 381/312–316, 381/320–322, 329
See application file for complete search history.

(56) References Cited

U.S. PATENT DOCUMENTS

| 3,974,335 A | 8/1976 | Blackledge |
| 4,128,738 A | 12/1978 | Gallery |
| 4,622,440 A * | 11/1986 | Slavin ........................ 381/313 |
| 4,823,908 A | 4/1989 | Tanaka |
| 4,955,729 A * | 9/1990 | Marx ........................ 381/322 |
| 5,313,663 A * | 5/1994 | Norris ........................ 455/351 |
| 5,321,758 A * | 6/1994 | Charpentier et al. ........ 381/317 |
| 5,357,578 A | 10/1994 | Taniishi |
| 5,526,411 A | 6/1996 | Krieter |

(Continued)

OTHER PUBLICATIONS

"Audio Spotlight—Put sound where you want it," Holosonic Research Labs, Inc., 2002, www.holosonics.com/technology.html (downloaded Jan. 18, 2004).
"Technology Introduction," American Technology Corporation, 2001, pp. 1-19.
"Technology Licensing—HyperSonic Sound," American Technology Corporation, 2003, pp. 1-3.

(Continued)

*Primary Examiner*—Wayne Young
*Assistant Examiner*—Dionne H Pendleton

(57) ABSTRACT

A hearing enhancement system that enhances a user's hearing based on a directional speaker is disclosed. In one embodiment, the system can include an interface unit that has a directional speaker and a microphone. The microphone captures input audio signals that are transformed into ultrasonic signals. The speaker transmits the ultrasonic signals, which are transformed into output audio signals by interaction with air. At least a portion of the output audio signals are modified to enhance the hearing of the user. Based on the system, the user's ear remains free from any inserted objects and thus is free from annoying occlusion effects. Compared to existing hearing aids, the system is relatively inexpensive. In another embodiment, the system can also be used as a phone. In yet another embodiment, the system can also access audio signals from other portable or non-portable instruments, wired or wirelessly, such as from home entertainment units, phones, microphones at a conference or speakers at a movie theater.

27 Claims, 12 Drawing Sheets

U.S. PATENT DOCUMENTS

| | | | |
|---|---|---|---|
| 5,572,575 | A | 11/1996 | Yamamoto et al. |
| 5,648,824 | A | 7/1997 | Dunn et al. |
| 5,793,875 | A | 8/1998 | Lehr et al. |
| 5,802,190 | A | 9/1998 | Ferren |
| 5,819,183 | A | 10/1998 | Voroba et al. |
| 5,828,768 | A | 10/1998 | Eatwell et al. |
| 5,835,732 | A | 11/1998 | Kikinis et al. |
| 5,943,430 | A | 8/1999 | Saitoh |
| 6,011,855 | A | 1/2000 | Selfridge et al. |
| 6,058,315 | A | 5/2000 | Clark |
| 6,086,541 | A | 7/2000 | Rho |
| 6,151,398 | A * | 11/2000 | Norris ................... 381/77 |
| 6,169,813 | B1 | 1/2001 | Richardson et al. |
| 6,243,472 | B1 * | 6/2001 | Bilan et al. ............. 381/117 |
| 6,275,596 | B1 * | 8/2001 | Fretz et al. .............. 381/321 |
| 6,322,521 | B1 | 11/2001 | Hou |
| 6,363,139 | B1 | 3/2002 | Zurek et al. |
| 6,445,804 | B1 | 9/2002 | Hirayanagi |
| 6,453,045 | B1 | 9/2002 | Zurek et al. |
| 6,477,258 | B1 | 11/2002 | Watson et al. |
| 6,496,205 | B1 | 12/2002 | White et al. |
| 6,535,612 | B1 | 3/2003 | Croft, III et al. |
| 6,584,205 | B1 | 6/2003 | Croft, III et al. |
| 6,631,196 | B1 * | 10/2003 | Taenzer et al. ........... 381/316 |
| 6,643,377 | B1 | 11/2003 | Takahashi et al. |
| 6,650,755 | B2 | 11/2003 | Vaudrey et al. |
| 6,895,261 | B1 | 5/2005 | Palamides |
| 7,013,009 | B2 * | 3/2006 | Warren ................. 379/420.01 |
| 2001/0055397 | A1 * | 12/2001 | Norris et al. ............. 381/79 |
| 2002/0012441 | A1 | 1/2002 | Matsunaga et al. |
| 2002/0048382 | A1 | 4/2002 | Hou |
| 2002/0048385 | A1 | 4/2002 | Rosenberg |
| 2002/0054689 | A1 | 5/2002 | Zhang et al. |
| 2002/0090099 | A1 | 7/2002 | Hwang |
| 2002/0090103 | A1 | 7/2002 | Calisto, Jr. |
| 2002/0183648 | A1 | 12/2002 | Hou |
| 2002/0191807 | A1 | 12/2002 | Asada et al. |
| 2003/0035552 | A1 | 2/2003 | Kolano et al. |
| 2003/0091200 | A1 | 5/2003 | Pompei |
| 2003/0092377 | A1 | 5/2003 | Hill |
| 2003/0118198 | A1 | 6/2003 | Croft, III et al. |
| 2003/0182104 | A1 | 9/2003 | Muesch |
| 2004/0202339 | A1 * | 10/2004 | O'Brien et al. ............ 381/312 |
| 2004/0204168 | A1 | 10/2004 | Laurila |

OTHER PUBLICATIONS

"Theory, History, and the Advancement of Parametric Loudspeakers—A Technology Overview," White Paper, American Technology Corporation, 2002, pp. 1-27.

"HSS Directed Audio Sound System, Model Series: 220," Product Information, American Technology Corporation, 2003.

A. C. Baker, "Nonlinear pressure fields due to focused circular apertures," The Journal of the Acoustical Society of America, 91(2), Feb. 1992, pp. 713-717.

A.L. Vyas et al., "Design Considerations of Parametric Arrays," IEEE Proceedings of the 1998 International Symposium on Underwater Technology, Apr. 15-17, 1998, pp. 98-102.

B. G. Lucas et al., "Field of a parametric focusing source," The Journal of the Acoustical Society of America,73 (6), Jun. 1983, pp. 1966-1971.

B.G. Lucas et al., "The field of a focusing source, "The Journal of the Acoustical Society of America, 72(4), Oct. 1982, pp. 1289-1296.

B.W. Lawton, "Damage to human hearing by ariborne sound of a very high frequency or ultrasonic frequency," Institute of Sound and Vibration Research, Contract Research Report 343/2001, 2001, pp. 1-77.

C. M. Darvennes et al., "Scattering of sound by sound from two Gaussian beams," The Journal of the Acoustical Society of America, 87(5), May 1990, pp. 1955-1964.

C.M. Darvennes et al., "Effects of absorption on the nonlinear interaction of sound beams," The Journal of the Acoustical Society of America, 89(3), Mar. 1991, pp. 1028-1036.

D. Marculescu et al., "Ready to Ware," IEEE Spectrum, Oct. 2003, pp. 28-32.

D.I. Havelock, "Directional Loudspeakers Using Sound Beams," J. Audio Eng. Soc., vol. 48, No. 10, Oct. 2000, pp. 908-916.

E.A. Zabolotskaya et al., "Quasi-plane Waves in the Nonlinear Acoustics of Confined Beams," Soviet Physics-Acoustics, vol. 15, No. 1, Jul.-Sep. 1969, pp. 35-40.

F.J. Pompei, "The Use of Airborne Ultrasonics for Generating Audible Sound Beams," J. Audio Eng. Soc., vol. 47, No. 9, Sep. 1999, pp. 726-731.

G. Garrett et al., "Nearfield of a large acoustic transducer, Part II: Parametric radiation," The Journal of the Acoustical Society of America, 74(3), Sep. 1983, pp. 1013-1020.

G. Garrett et al., "Nearfield of a large acoustic transducer. Part III: General results," The Journal of the Acoustical Society of America, 75(3), Mar. 1984, pp. 769-779.

H.O. Berktay, "Possible Exploitation of Non-Linear Acoustics in Underwater Transmitting Applications," J. Sound Vib. (1965) 2(4), 435-461.

i60c Phone User's Guide, Nextel Communications, 2002, pp. 6, 65, 66, 135-137.

J. Berntsen et al., "Interaction of sound waves. Part IV: Scattering of sound by sound," The Journal of the Acoustical Society of America, 86(5), Nov. 1989, pp. 1968-1983.

J. Berntsen et al., "Nearfield of a large acoustic transducer. Part IV: Second harmonic and sum frequency radiation," The Journal of the Acoustical Society of America, 75(5), May 1984, pp. 1383-1391.

J. Meyer, "Microphone Array for Hearing Aids taking into Account the Scattering of the Head," 2001 IEEE Workshop on Applications of Signal Processing to Audio and Acoustics, Oct. 21-24, 2001, pp. 27-30.

J. N. Tjotta et al., "Propagation and interaction of two collinear finite amplitude sound beams," The Journal of the Acoustical Society of America, 88(6), Dec. 1990, pp. 2859-2870.

J. Zemanek, "Beam Behavior within the Nearfield of a Vibrating Piston," The Journal of the Acoustical Society of America, vol. 42, No. 1 (Part 2), 1971, pp. 181-191.

K. Aoki et al., "Parametric Loudspeaker-Applied Examples," Electronics and Communications in Japan, Part 3, vol. 77, No. 1, 1994, pp. 64-74.

K. Maney, "Sound technology turns the way you hear on its ear," USA Today, May 2003, pp. 1-4.

M. Greenspan, "Piston radiator: Some extensions of the theory," The Journal of the Acoustical Society of America, 65(3), Mar. 1979, pp. 608-621.

M. Yoneyama et al., "The audio spotlight: An application of nonlinear interaction of sound waves to a new type of loudspeaker design," The Journal of the Acoustical Society of America ,73(5), May 1983, pp. 1532-1536.

M.A. Averkiou et al., "Self-demodulation of amplitude- and frequency-modulated pulses in a thermoviscous fluid," The Journal of the Acoustical Society of America, 94(5), Nov. 1993, pp. 2876-2883.

M.B. Bennett et al., "Parametric array in air," The Journal of the Acoustical Society of America, vol. 57, No. 3, Mar. 1975, pp. 562-568.

Nextel i60c Phone Details, http://nextelonline.nextel.com, downloaded Apr. 22, 2003, pp. 1-2.

Nextel-Direct Connect, http://nextelonline.nextel.com/services/directconnect-popup.html, downloaded Apr. 22, 2003, p. 1.

P.J. Westervelt, "Parametric Acoustic Array," The Journal of the Acoustical Society of America, vol. 35, No. 4, Apr. 1963, pp. 535-537.

Palm™ m515 Handheld, Palm Store of Yahoo! Shopping, downloaded Apr. 23, 2003, pp. 1-2.

Palm™ PalmModem® Connectivity Kit, Palm Store of Yahoo! Shopping, downloaded Apr. 23, 2003, pp. 1-2.

Palm™ Tungsten™ C Handheld, Palm Store of Yahoo! Shopping, downloaded Apr. 23, 2003, pp. 1-3.

Palm™ Zire™ 71 Handheld, Palm Store of Yahoo! Shopping, downloaded Apr. 23, 2003, pp. 1-3.

T. Kamakura et al., "Suitable Modulation of the Carrier Ultrasound for a Parametric Loudspeaker," ACUSTICA, vol. 73 (1991), pp. 215-217.

T. Kamakura et al., "Harmonic generation in finite amplitude sound beams from a rectangular aperture source," The Journal of the Acoustical Society of America, 91(6), Jun. 1992, pp. 3144-3151.

T. Kamakura et al., "Nonlinearly generated spectral components in the nearfield of a directive sound source," The Journal of the Acoustical Society of America, 85(6), Jun. 1989, pp. 2331-2337.

T.D. Kite et al., "Parametric Array in Air: Distortion Reduction by Preprocessing," Proceedings of the 16th International Congress on Acoustics and the 135th Meeting of the Acoustical Society of America, Seattle, WA, Jun. 1998, pp. 1091-1092.

T.G. Muir et al., "Parametric Acoustic Transmitting Arrays," The Journal of the Acoustical Society of America, vol. 52, No. 5, Part 2, 1972, pp. 1481-1486.

V.P. Kuznetsov, "Equations of Nonlinear Acoustics," Soviet Physics-Acoustics, vol. 16, No. 4, Apr.-Jun. 1971, pp. 467-470.

W.F. Druyvesteyn et al., "Personal Sound," J. Audio Eng. Soc., vol. 45, No. 9, Sep. 1997, pp. 685-701.

Y.W. Kim et al., "Novel Preprocessing Technique to Improve Harmonic Distortion in Airborne Parametric Array," ICSP '02 Proceedings, pp. 1815-1818.

Z.A. Gol'dberg, "Certain Second-Order Quantities in Acoustics," SOV PHYS ACOUST, vol. 3, 1957, pp. 157-162.

PCT Written Opinion of the International Searching Authority, RE: PCT/US04/11972, Jan. 31, 2005.

Y.W. Kim et al., "Novel Preprocessing Technique to Improve Harmonic Distortion in Airborne Parametric Array," ICSP '02 Proceedings, pp. 1815-1818, cmplete date not provided.

* cited by examiner

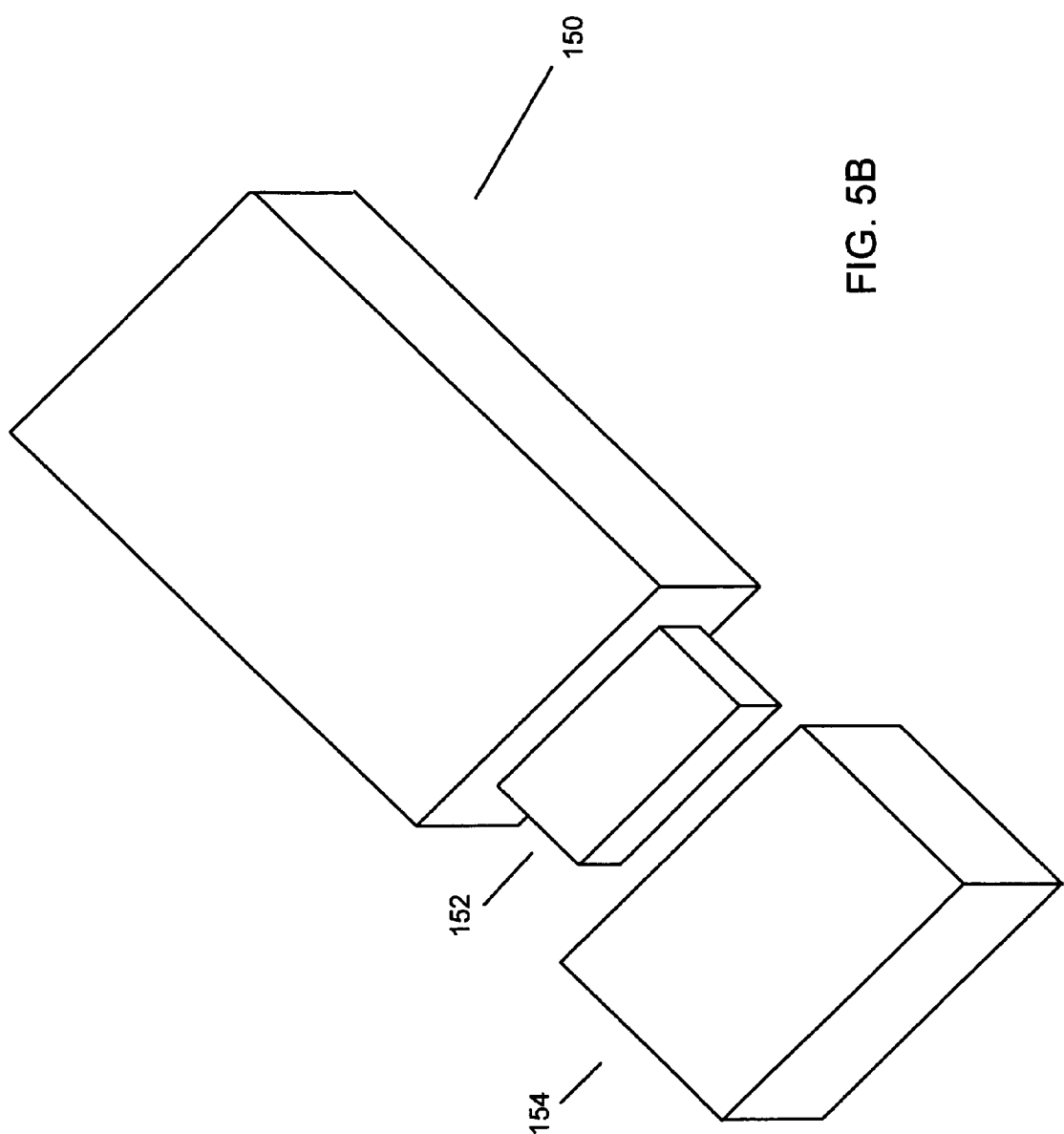

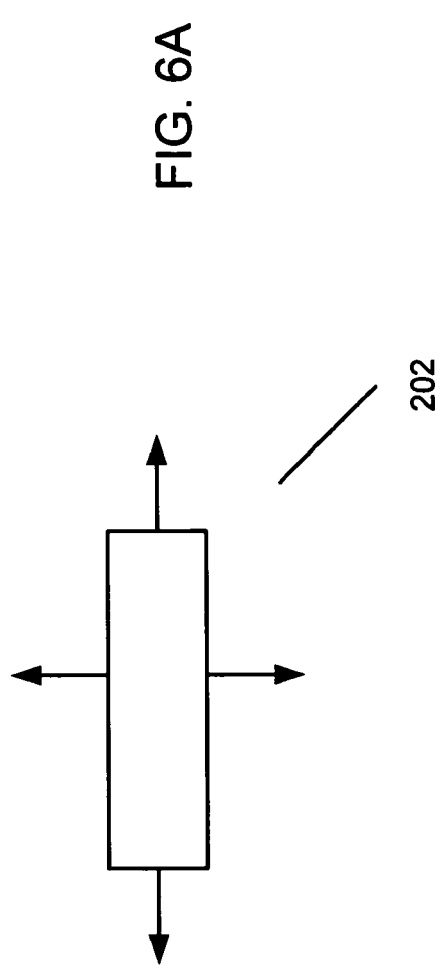
FIG. 6A
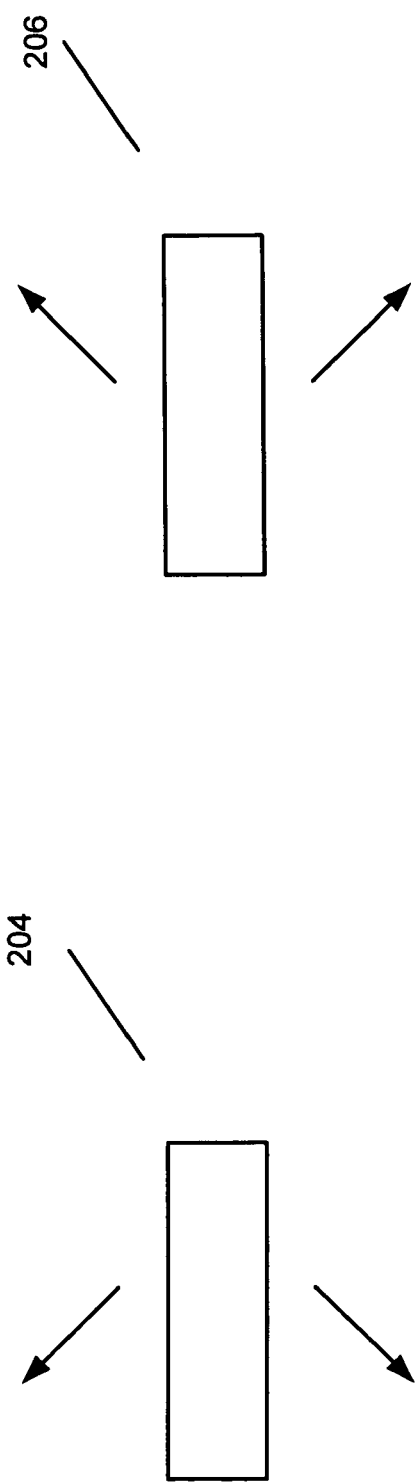
FIG. 6B
FIG. 6C

DIRECTIONAL HEARING ENHANCEMENT SYSTEMS

CROSS-REFERENCE TO RELATED APPLICATIONS

This application claims priority of: (i) U.S. Provisional Patent Application No. 60/462,570, filed Apr. 15, 2003, and entitled "WIRELESS COMMUNICATION SYSTEMS OR DEVICES, HEARING ENHANCEMENT SYSTEMS OR DEVICES, AND METHODS THEREFOR," which is hereby incorporated herein by reference; (ii) U.S. Provisional Patent Application No. 60/469,221, filed May 12, 2003, and entitled "WIRELESS COMMUNICATION SYSTEMS OR DEVICES, HEARING ENHANCEMENT SYSTEMS OR DEVICES, DIRECTIONAL SPEAKER FOR ELECTRONIC DEVICE, PERSONALIZED AUDIO SYSTEMS OR DEVICES, AND METHODS THEREFOR," which is hereby incorporated herein by reference; and (iii) U.S. Provisional Patent Application No. 60/493,441, filed Aug. 8, 2003, and entitled "WIRELESS COMMUNICATION SYSTEMS OR DEVICES, HEARING ENHANCEMENT SYSTEMS OR DEVICES, DIRECTIONAL SPEAKER FOR ELECTRONIC DEVICE, AUDIO SYSTEMS OR DEVICES, WIRELESS AUDIO DELIVERY, AND METHODS THEREFOR," which is hereby incorporated herein by reference.

This application is also related to: (i) U.S. patent application Ser. No. 10/826,529 (now U.S. Pat. No. 7,269,452), filed concurrently, and entitled, "DIRECTIONAL WIRELESS COMMUNICATION SYSTEMS," which is hereby incorporated herein by reference; (ii) U.S. patent application Ser. No. 10/826,531, filed concurrently, and entitled, "DIRECTIONAL SPEAKER FOR PORTABLE ELECTRONIC DEVICE," which is hereby incorporated herein by reference; (iii) U.S. patent application Ser. No. 10/826,537, filed concurrently, and entitled, "METHOD AND APPARATUS FOR LOCALIZED DELIVERY OF AUDIO SOUND FOR ENHANCED PRIVACY," which is hereby incorporated herein by reference; and (iv) U.S. patent application Ser. No. 10/826,528, filed concurrently, and entitled, "METHOD AND APPARATUS FOR WIRELESS AUDIO DELIVERY," which is hereby incorporated herein by reference.

BACKGROUND OF THE INVENTION

1. Filed of the Invention

The present invention relates generally to a hearing enhancement system, and more particularly, to a hearing enhancement system whose audio signals are directional.

2. Description of the Related Art

A significant portion of our population has a certain degree of hearing loss. This can be due to, for example, heredity, noise exposure or simply aging. Hearing aids have been the traditional approach to ameliorate hearing difficulties. However, out of the 26 to 28 million people who are hearing impaired in the United States, only about 20% of them actually wear any hearing aids.

One reason people avoid wearing hearing aids is because hearing aids are not expensive. Typically, they range from about a thousand US dollars for a pair of analog hearing aids to five thousand US dollars for a pair of digital hearing aids.

Another reason for the lack of wide adoption of hearing aids is that there is still a stigma towards wearing them. People who need hearing aids are known as "hearing impaired." When they go to a dispenser for hearing aids, they are still called "patients." If given a choice, most people do not want others to know that they need hearing aids. As a result, many people with mild or moderate hearing loss do not wear one.

Basically, there are three major types of hearing aids—the "behind-the-ear" (BTE) style, the "in-the-ear" (ITE) style, and the completely-in-the-canal (CIC) style. The BTE hearing aids have a number of advantages. They are more applicable for those with severe hearing loss. Through the use of venting, they reduce to a certain degree the effects of occlusion, which is the hollowness, echoic or stuffed sensation of hearing one's own voice as one talks with a hearing aid inside one's ear. The BTE aids are encapsulated in relatively thick-walled housings. The housing serves to protect components in the hearing aids from harsh conditions due to temperature, sweat, pressure and impact. However, for those wearing hearing aids, they usually prefer a more inconspicuous type, such as an ITE (or CIC) hearing aid, which is located inside the ear canal.

The ITE (or CIC) designs have other benefits. People who use a telephone typically prefer them because they do not require a telephone loop to work with telephone conversations. People who wear glasses usually also prefer them because the hearing aids do not interfere with the arms of the glasses.

On the other hand, just like the BTE, individual ear molds have to be made for the ITE and the CIC hearing aids. The shell of the ITE hearing aid has to be individually configured based on an impression of the patient's canal. Not only is the hearing aid individually formed, a technician, through experience and craftsmanship, has to custom fit the hearing aid into the patient's canal. For a BTE hearing aid, an ear mold that fits the individual's ear canal is also made. This makes the hearing aid a custom product. If a hearing aid is lost or damaged, it is not as easily replaced.

The repair process can be annoying as well. If a user's hearing aid has to be repaired, the process can take a significant amount of time. Except for well-known brands or for manufacturers that offer a worldwide service, repair parts may not be immediately available. Since most hearing aids are still dispensed through local or regional clinics, they may not have the available parts. Though there is usually a loaner's program that allows the user to borrow a BTE aid during this period, the user may have to live, for days or weeks, with a hearing aid that may not feel comfortable.

Another challenge of an ITE (or CIC) hearing aid is in positioning its receiver and microphone because slight misalignment can lead to feedback and resonance.

Users want the ITE (or CIC) hearing aids to be small to make them inconspicuous. However, the inherent small size of the hearing aids brings along its problems. Due to the small size, the walls of its shell are thinner, making them more vulnerable to damage from heat, sweat and abuse than BTE hearing aids. Further, due to its small size and shape, ITE (or CIC) hearing aids are more difficult to handle. For example, sometimes it is cumbersome to switch batteries. And, it is also easier to accidentally drop an ITE (or CIC) aid than a BTE hearing aid. Finally, an ITE (or CIC) hearing aid custom-fits into the user's ear canal. The occlusion effects can be quite disturbing, particularly for the first time hearing aid users.

Hearing tends to decrease gradually. A person with mildly-decreased hearing normally does not need the same degree of hearing assistance as would one with severely-impaired hearing. Nevertheless, such a person could benefit from mild or moderate enhancement to their hearing.

It should be clear from the foregoing that there is still a need for improved techniques to assist those who are hearing impaired.

SUMMARY OF THE INVENTION

The present invention pertains to a hearing enhancement system that enhances an individual's hearing based on a directional speaker. Many people are mildly or moderately hearing impaired. The decrease in hearing ability may not be to the point where one needs a dedicated, traditional hearing aid. Even so, it would certainly be advantageous to provide some hearing improvement. A number of embodiments in the present invention are particularly suitable for those with mild or moderate hearing loss.

One embodiment of the hearing enhancement system includes an interface unit that has the directional speaker and a microphone. In another embodiment, the system also includes a base unit. A user can wear the system on his clothing, and the speaker can be directed towards an ear of the user when worn.

In one embodiment, the microphone receives audio signals, which are transformed by the system into ultrasonic signals. Then, the directional speaker transmits the ultrasonic signals in air towards an ear of the user. The transmitted signals are transformed back into audio signals by air to form the output audio signals. At least a portion of the output audio signals have higher power with respect to the received audio signals at corresponding frequencies to enhance the hearing of the user.

The directivity of the audio signals is increased due to the ultrasonic signals. In one embodiment, the directivity is further increased by using a phase array of speaker devices. The array can generate the directional audio signals by constructive interference of signals from the individual devices. Based on the array, the direction of the audio signals can be steered by changing the relative phases among the devices.

Typically, the hearing of both ears decreases together. Hence, a user might use two interface units, one for the left and the other for the right ear.

The decrease in hearing may not be uniform across all audio frequencies. As a result, amplifying the received audio signals can be frequency dependent. One approach focuses on amplifying high audio frequencies. Another approach amplifies only a certain band of the audio frequencies. With the lower audio frequencies typically being louder, the band of amplification can be the higher audio frequencies. Since the directional speaker is not attached to or inserted in the ear, the user can still hear the audio signals directly from the audio source. Not only would such an approach eliminate the occlusion effect, with no hearing aid in the ear canal, the natural resonance of the ear canal (typically around 2700 Hz) boosts the audio signal strength in the 2 to 3 kHz ranges. Furthermore, without the hearing aid in the ear canal, there is no insertion loss due to the hearing aid.

In a third approach, the user's hearing is profiled so that frequency amplification is tailored to the user. The user's hearing profile can also be stored in a memory device (such as a removable memory card or stick), which can be inserted into the system. The system can then adjust the amplification of the audio signals across the frequencies based on the user's hearing profile. Frequency-dependent amplification has the added advantage of power conservation because certain audio frequencies may not even need amplification.

A number of embodiments include power management features. One embodiment includes a manual on/off switch allowing the user to turn the system off when desired. In another approach, the system is on-demand. If the signal-to-noise ratio of the incoming audio signals is below a pre-set threshold, the system can be placed in a standby mode (e.g., low power mode).

Another approach that can manage power is to use a directional microphone. This approach can also improve the signal-to-noise ratio. There can be more than one directional microphone, each pointing at a specific direction.

The power level of the output audio signals can also be environment dependent. For example, the power of the output audio signals is increased in a noisier environment. But, as the environment becomes very noisy, the amplification can cease or even be decreased.

The power of the output audio signals can be also increased through different mechanisms. This can be done, for example, by increasing the surface areas of the medium responsible for generating the output audio signals. In embodiments based on ultrasonic transformation, one approach to increase power is to increase the demodulation efficiency. In yet another embodiment, power is increased based on a phase-array of speaker devices, which further increases the directivity of the audio signals. This embodiment has the added advantage of power reduction. With the audio signals more confined, less power is needed to generate the audio signals. In one embodiment, the output audio signals can also be steered to more accurately target the user's ear.

With the ear canal remaining open, the user can still use a phone directly. But, in one embodiment, when there is an incoming phone call, the system changes its mode of operation and functions as a cell phone. If the system is used as a phone, since the audio signals are transmitted in an open environment, people next to the user might pick up the audio signals. Different approaches can be used to improve privacy. The audio signal propagation angle already serves to provide improved privacy. The virtual or physical cone of the audio signals typically propagates from a lower position (elevation) to a higher position towards the ear of the user. With such a propagation direction, signals reflected from the head tend to radiate upward. This reduces the chance of having bystanders eavesdrop on the conversation.

Privacy can be enhanced based on frequency-dependent amplification because certain frequency ranges may not even be amplified. Another approach to improve privacy is to reduce the power of the output audio signals. Yet another approach to enhance privacy is to further increase the directivity of the audio signals.

With the system being used as a phone, the system can have a directional microphone pointing at the head of the user to pick up the user's voice during a phone conversation.

In private, hearing impaired people sometimes might have a tendency to increase the sound level of audio or video instruments a bit too high. On the other hand, in public, hearing impaired people sometimes might have difficulty hearing. In one embodiment, the system is further designed to pick up, capture or access audio signals from a number of portable or non-portable instruments. Audio signals from these instruments can be transmitted through wire to the system. Alternatively, audio signals from these instruments can be transmitted wireless, such as through WiFi or Bluetooth, to the system. The system then converts the wireless signals to audio signals for the user to comfortably listen to the signals. Examples of such instruments include home entertainment units, phones, microphones at a conference, and speakers at a movie theaters.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 5B shows an embodiment of the interface unit with an electrical connection.

FIGS. 6A-6C show different embodiments regarding microphones for use with the present invention.

Same numerals in FIGS. 1-11 are assigned to similar elements in all the figures. Embodiments of the invention are discussed below with reference to FIGS. 1-11. However, those skilled in the art will readily appreciate that the detailed description given herein with respect to these figures is for explanatory purposes as the invention extends beyond these limited embodiments.

DETAILED DESCRIPTION OF THE INVENTION

The present invention pertains to a hearing enhancement system that enhances an individual's hearing. A number of embodiments in the present invention are particularly suitable for those with mild or moderate hearing loss.

Figure 1:
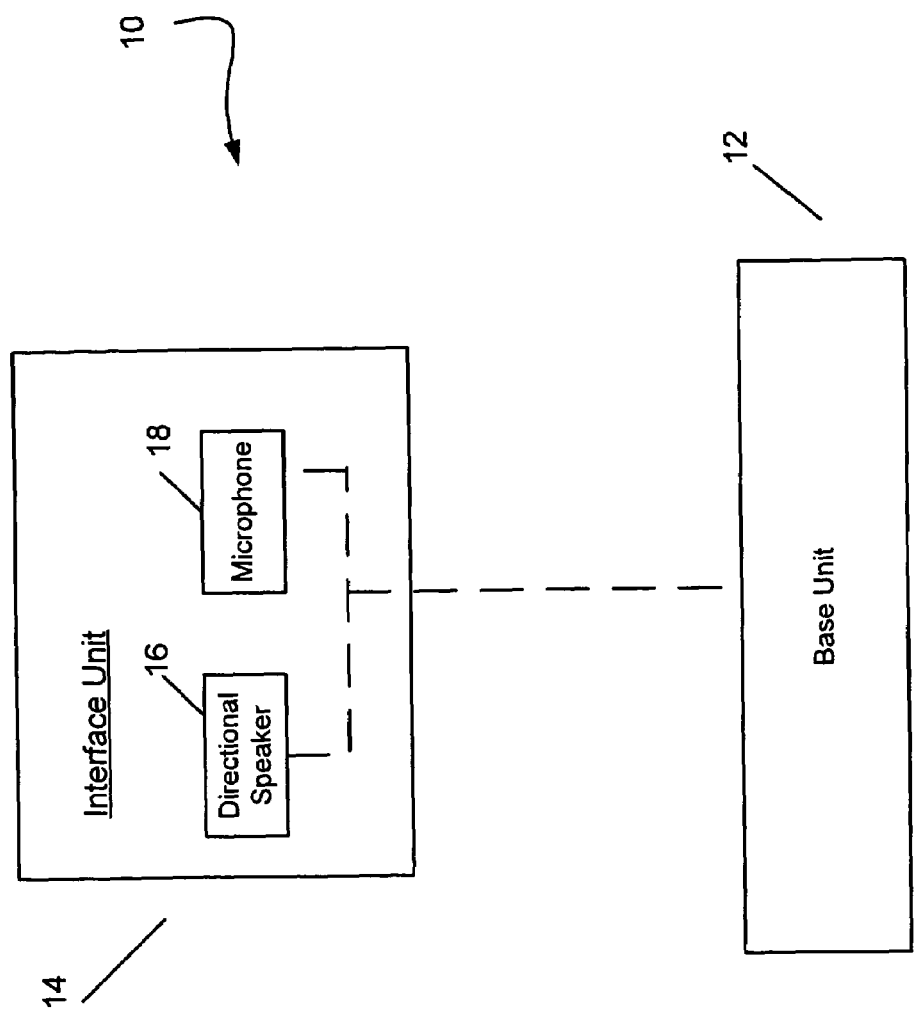
FIG. 1 shows embodiments of the present invention.

FIG. 1 shows one embodiment of a hearing enhancement system 10 of the present invention. The hearing enhancement system 10 includes an interface unit 14, which includes a directional speaker 16 and a microphone 18. The embodiment may also include a base unit 12, which has or, can couple to, a power source. The interface unit 14 can electrically couple to the base unit 12. In one embodiment, the base unit 12 can be integrated within the interface unit 14. The coupling can be in a wired (e.g., cable) or a wireless (e.g., Bluetooth technologies) manner.

Figure 2:
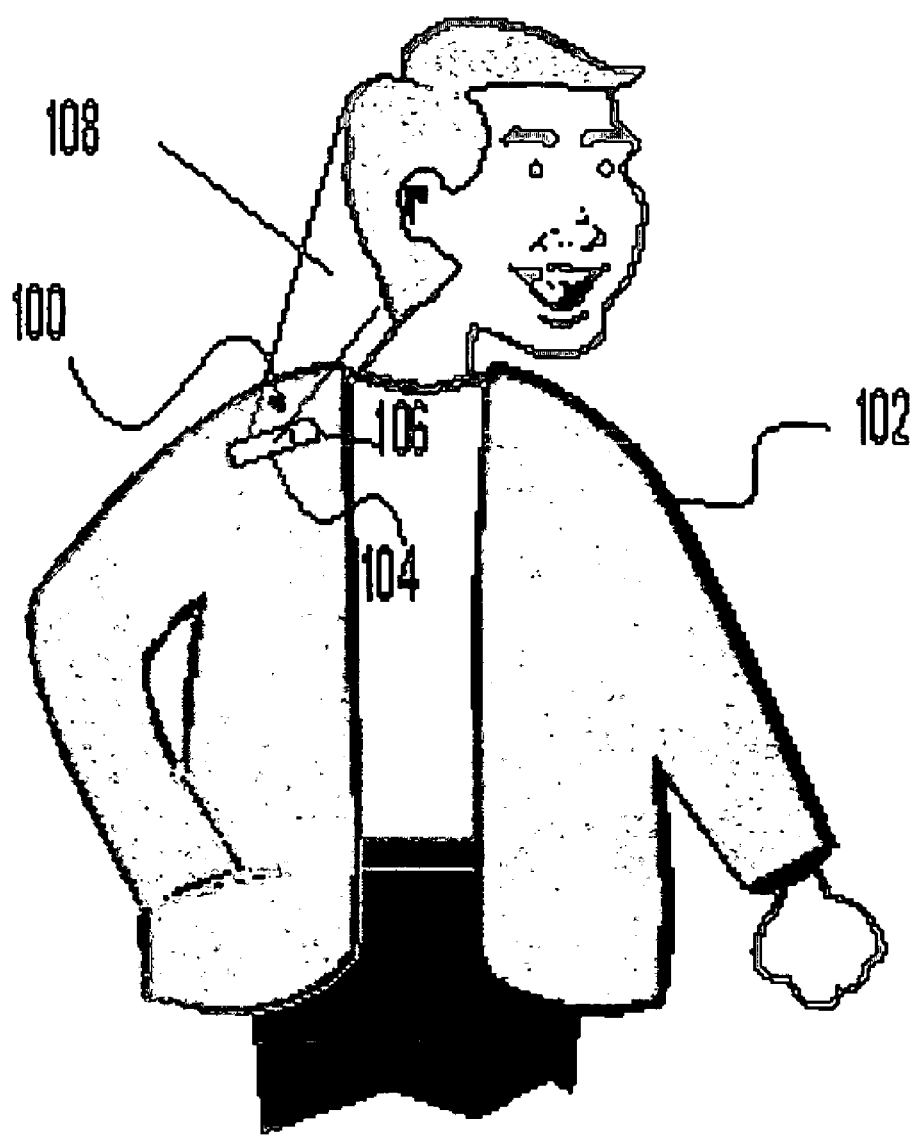
FIG. 2 shows a person wearing one embodiment of the present invention.

FIG. 2 shows a person wearing an interface unit 100 of the present invention on his jacket 102. The interface unit 100 can, for example, be the interface unit 14 shown in FIG. 1. Again, the interface unit 100 includes a directional speaker 104 and a microphone 106. The speaker 104 can be in a line of sight of an ear of the user.

Consider the scenario where a friend is speaking to the user. In one approach, the microphone 106 picks up the friend's speech, namely, her audio signals. A hearing enhancement system according to the invention can then use the audio signals to modulate ultrasound signals. Then, the directional speaker 104 transmits the modulated ultrasonic signals in air towards the ear of the user. The transmitted signals are demodulated in air to create the output audio signals. Based on ultrasound transmission, the speaker 104 generates directional audio signals and sends them as a cone (virtual cone) 108 to the user's ear. In another approach, the directional speaker 104 includes a physical cone or a horn that directly transmits directional audio signals. In yet another approach, the audio signals from the speaker can be steered to the ear or the ear canal, whose location can be identified through mechanisms, such as pattern recognition. Different embodiments of the directional speakers have been described in U.S. patent application Ser. No. 10/826,529, filed concurrently, and entitled "DIRECTIONAL WIRELESS COMMUNICATION SYSTEMS," which is hereby incorporated herein by reference.

Typically, hearing of both ears decreases together. In a sense, this is similar to our need to wear glasses. Rarely would one eye of a person need glasses, while the other eye has 20/20 vision. As a result, there can be two interface units, one for the left ear and another for the right ear. The left ear unit can be on the left shoulder, and the right ear unit can be on the right shoulder. These two interface units can be electrically coupled, or can be coupled to one base unit. Again, the coupling can be wired or wireless. In another approach, the interface unit can be worn by the user as a pendant on a necklace in front of the user. Output audio signals can then be propagated to both ears.

Figure 3:
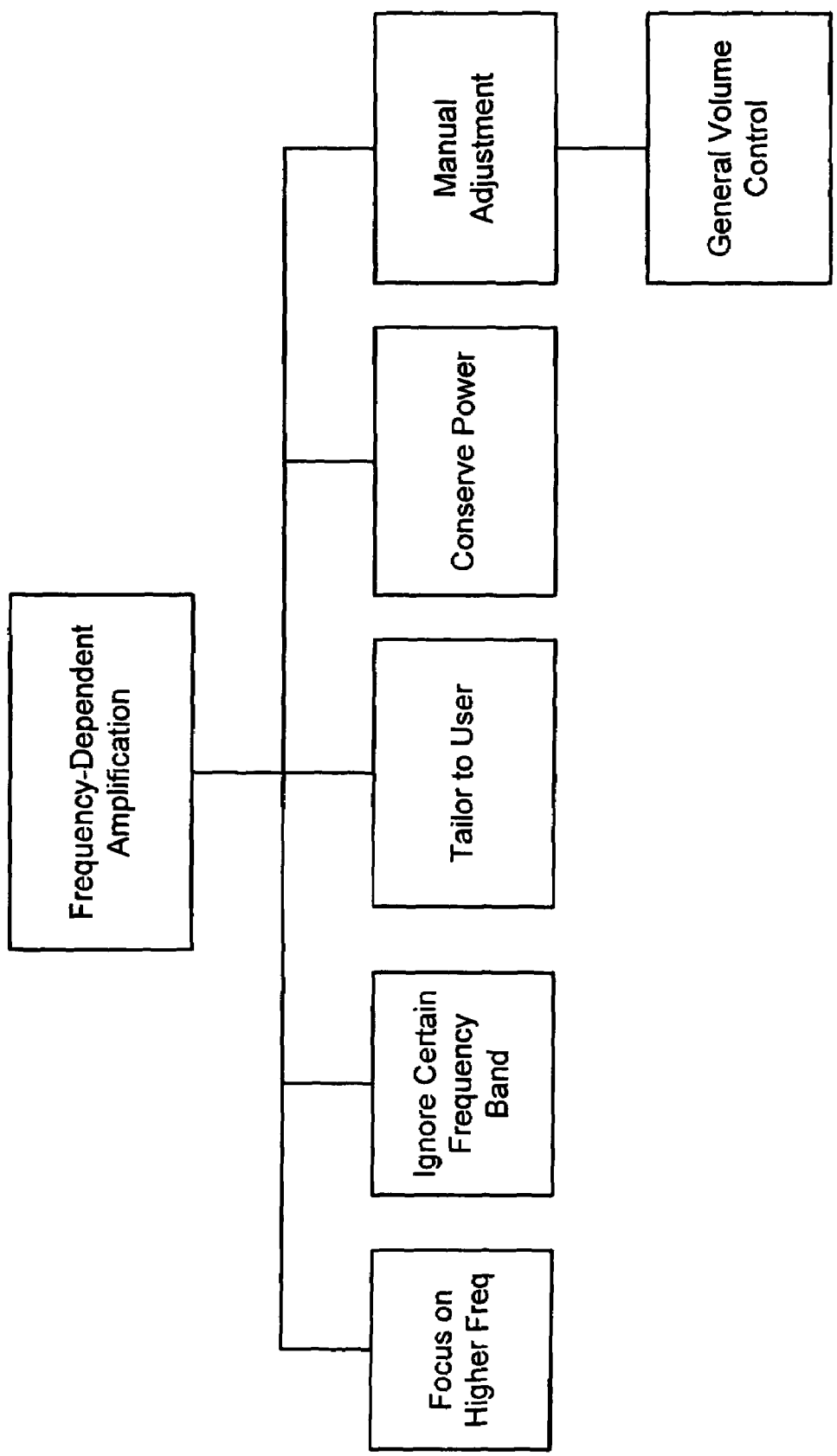
FIG. 3 shows different embodiments regarding frequency-dependent amplification of the present invention.

In one embodiment, the system is designed to operate in the frequency range between 500 Hz to 8 kHz. Typically, a user's hearing impairment is not the same across all audio frequencies. For example, in English, the user might be able to easily pick up the sound of vowels, but not the sound of consonants, such as "S" and "P". FIG. 3 shows different embodiments of the invention regarding frequency-dependent amplification of the received audio signals. Note that amplification is not limited to amplifying the received audio signals directly. For example, in the embodiments using ultrasonic signals to generate output audio signals, amplification can mean the power level of the output audio signals being higher than the received audio signals. This can be through increasing the power of the ultrasonic signals.

One approach for frequency-dependent amplification assumes that the decreased in hearing typically starts at high frequencies, such as above 2 to 3 kHz. So, hearing may need more assistance at the high frequency range. In this approach, one embodiment amplifies the audio signals so that around the entrance of the ear, the signals can have sound pressure level ("SPL") of about 80 dB from 2 kHz to 4 kHz. For frequencies below 2 kHz, the SPL is lower, such as, for frequencies lower than 500 Hz, the maximum SPL can be below 55 dB. In one embodiment, the SPL of the output audio signals can be 70 dB from 1.5 kHz to 4 kHz, and the 3 dB cutoff is also at 1.5 kHz. With a roll off being 12 dB/octave, at 750 Hz, the SPL becomes about 58 dB.

Another frequency-dependent amplification approach assumes that most information in the audio signals resides within a certain frequency band. For example, about 70% of the information in the audio signals can be within the frequency range of 1 to 2 kHz. Since the ear canal remains open and the user may only be mildly or moderately hearing impaired, the user can be hearing the audio signals directly from his sender (i.e., without assistance provided by the hearing enhancement system). In this approach, the system filters audio signals in the identified frequency range, such as the 1 to 2 kHz range, and processes them for amplification and transmission to the user. For frequencies not within the frequency band, they are not processed for amplification. The user can pick them up directly from the sender.

Low to mid frequencies, such as those below 2 kHz, are typically louder. Since the hearing enhancement system does not require having any hearing aid inserted into the ear, the low to mid frequencies can be received at the ear unaltered. Frequencies in the mid to high range, such as from 2000-3000 Hz, will be in the natural resonance of the ear canal, which is typically around 2700 Hz. As a result, these frequencies can be increased by about 15 dB. With no hearing aid inserted into one ear, the audio signals do not experience any insertion loss, and there is also no occlusion effect due to the user's own voice.

In a third approach, amplification across frequencies is directly tailored to the hearing needs of the user. This can be done through calibration. This third approach can also be used in conjunction with either the first approach or the second approach.

Frequency-dependent amplification has the added advantage of power conservation because certain frequency bands may not need or may not have amplification.

In one embodiment, the user has the option of manually changing the amplification of the system. The system can also have a general volume controller that allows the user to adjust the output power of the speaker. This adjustment can also be across certain frequency bands.

Figure 4:
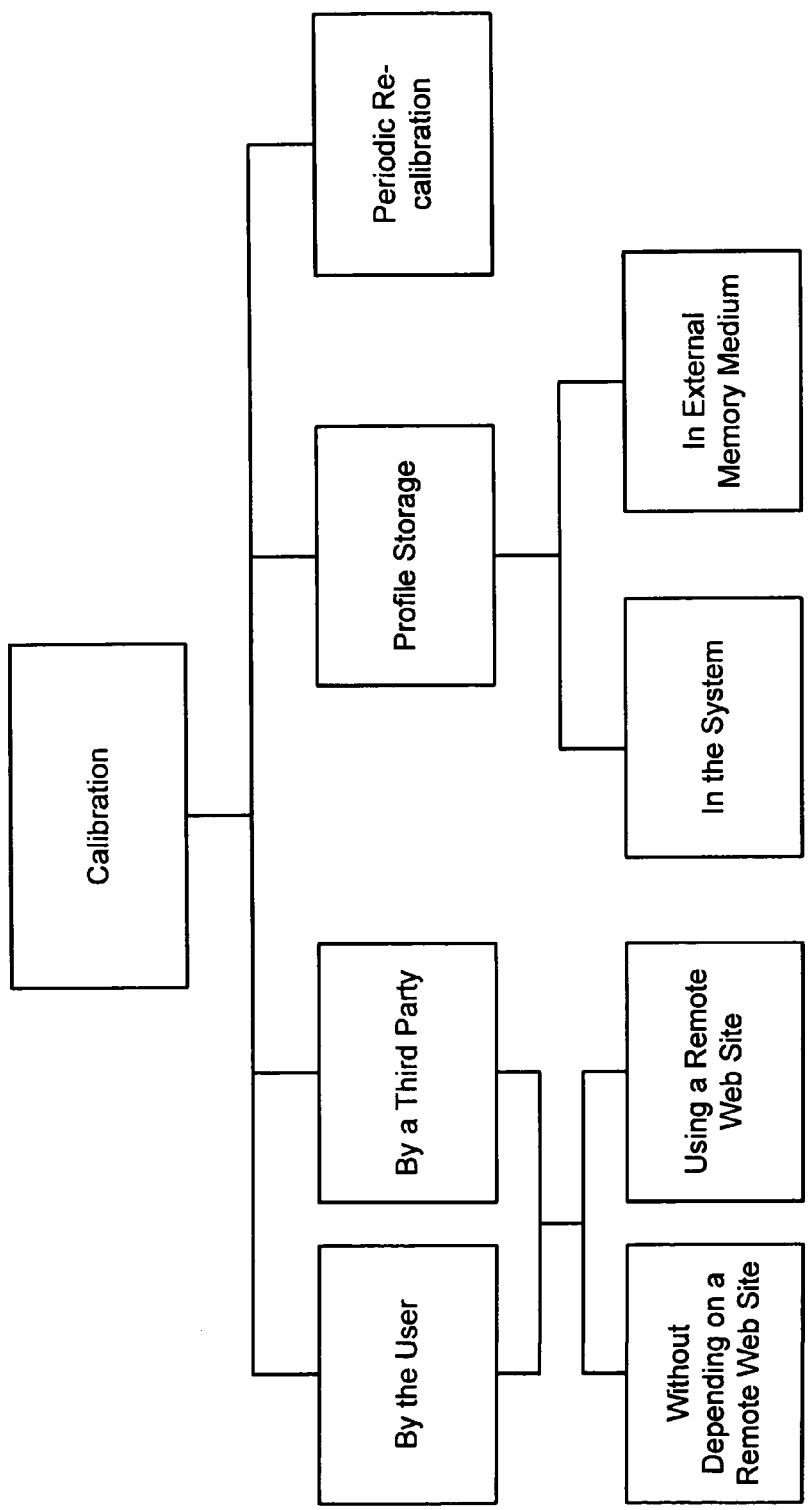
FIG. 4 shows a number of embodiments regarding calibration of the present invention.

FIG. 4 shows a number of embodiments regarding calibration of a user's hearing across various frequencies. Calibration enables the system to determine (e.g., estimate) the hearing sensitivity of the user. Through calibration, the user's hearing profile can be generated. The user can perform calibration by himself. For example, the audio frequencies are separated into different bands. The system generates different SPL at each band to test the user's hearing. The specific power level that the user feels most comfortable would be the power level for that band for the user. After testing is done for all of the bands, based on the power levels for each band, the system creates the user's personal hearing profile. In this calibration process, the system can prompt the user and lead the user through an interactive calibration process.

In another embodiment, calibration can be done remotely through a web site. The web site can guide the user through the calibration process. This can be done, for example, by the user being positioned proximate to a computer terminal that is connected through the Internet to the web site. The terminal has a speaker or headset that produces audio sounds as part of the calibration process.

Instead of the user, this calibration process can also be done by a third party, such as an audiologist.

The user's hearing profile can be stored in the hearing enhancement system. If the calibration is done through a computer terminal, the hearing profile can be downloaded into the hearing enhancement system wirelessly, such as through Bluetooth or infrared technology. The hearing profile can alternatively be stored in a portable media storage device, such as a memory stick. The memory stick could be inserted into the hearing enhancement system, or some other audio generating device, which desires to access the hearing profile and personalizes the system's amplification across frequencies to the user.

The system can also periodically alert the user for re-calibration. The period can be, for example, once a year. The calibration can also be done in stages so that it is less onerous and less obvious that a hearing evaluation is being performed.

Since the ear canal is open, the user can be hearing the audio signals both from the sender and the system. In one embodiment, to prevent echoing effect, signal processing speed of the system cannot be too low. Typically, the user would not be able to distinguish two identical sets of audio signals if the difference in arrival times of the two signals is below a certain delay time, such as 10 milliseconds. In one embodiment, the system's signal processing speed is faster than that the certain delay time. One approach to transform the input audio signals to ultrasonic signals depends on analog signal processing. Another approach to transform the input audio signals to ultrasonic signals depends on digital signal processing.

Figure 5A:
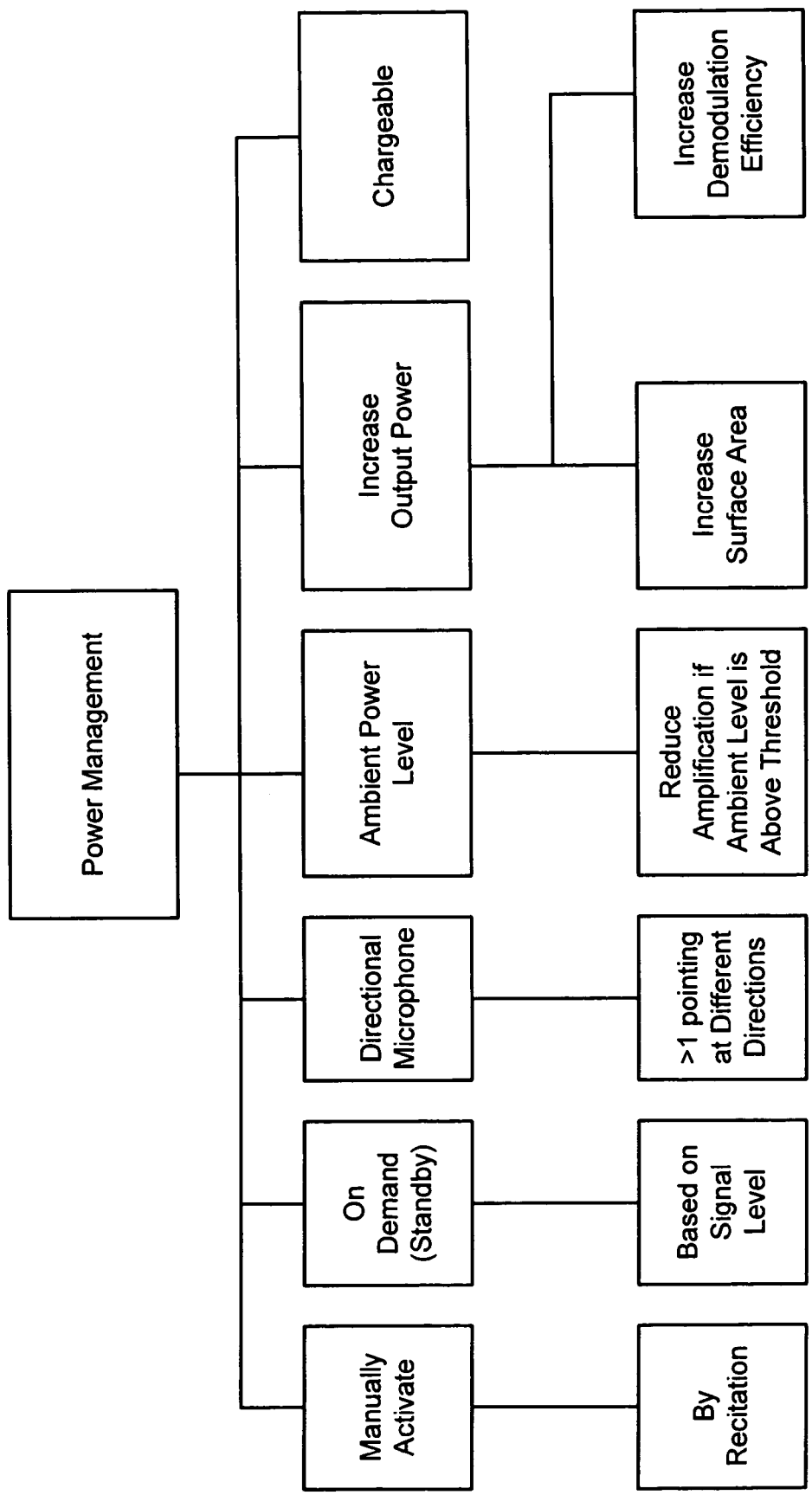
FIG. 5A shows a number of embodiments regarding power management of the present invention.

Since the system might be on continuously for a long duration of time, and can be amplifying across a broad range of the audio frequencies, power consumption can be an issue. FIG. 5A shows a number of embodiments for managing power consumption of the system. One embodiment includes a manual on/off switch, which allows the user to manually turn the system off as he desires. The on/off switch can be on a base unit, an interface unit, or a remote device. This on/off switch can also be voice activated. For example, the system is trained to recognize specific recitation, such as specific sentences or phrases, and/or the user's voice. To illustrate, when the user says sentences like any of the following, the system would be automatically turned on: What did you say? What? Louder. You said what?

The system can be on-demand. In one embodiment, the system can identify noise (e.g., background noise), as opposed to audio signals with information. To illustrate, if the audio signals across broad audio frequency ranges are flat, the system could assume that the input audio signals are noise. In another approach, if the average SPL of the input audio signals is below a certain level, such as 40 dB, the system would assume that there are no audio signals worth amplifying. In any case, when the system recognizes that signals are not to be amplified, the system can then be deactivated, such as to be placed into a sleep mode, a reduced power mode or a standby mode.

With the system operating on-demand, when the sender stops talking for a duration of time, the system can be deactivated. This duration of time can be adjustable, and can be, for example, 10 seconds or 10 minutes. In another approach, only when the signal-to-noise ratio of the audio signals is above a preset threshold would the system be activated (i.e., awakened from the sleep mode, the reduced power mode or the standby mode).

Another approach to manage power consumption can make use of a directional microphone. This approach can improve the signal-to-noise ratio. The gain at specific directions of such a microphone can be 20 dB higher than omni-directional microphones. The direction of the directional microphone can vary with application. However, in one embodiment, the direction of the directional microphone can be pointing forward or outward from the front of the user. The assumption is that the user typically faces the person talking to him, and thus it is the audio signals from the person in front of him that are to be enhanced.

The system, namely, the interface unit, can have more than one directional microphone, each pointing in a different direction. FIG. 6A shows an interface unit 202 with four directional microphones pointing in four orthogonal directions. With the microphones in symmetry, the user does not have to think about the orientation of the microphones if the user is attaching the interface unit to a specific location on his clothing.

FIGS. 6B-6C show interface units 204 and 206, each with two directional microphones pointing in two orthogonal directions. For the two interface units 204 and 206 shown in FIG. 6B-6C, one unit can be on the left shoulder and the other unit on the right shoulder of the user, with the user's head in between the interface units in FIG. 6B and FIG. 6C.

The amplification of the system can also depend on the ambient power level, or the noise level of the environment of the system. One approach to measure the noise level is to measure the average SPL at gaps of the audio signals. For example, a person asks the user the following question, "Did you leave your heart in San Francisco?" Typically, there are gaps between every two words or between sentences or phrases. The system measures, for example, the root mean square ("rms") value of the power in each of the gaps, and can calculate another average among all of the rms values to determine the noise level. In one embodiment, the system increases the gain of the system so as to ensure that the average power of the output audio signals is higher than the noise level by a certain degree. For example, the average SPL of the output audio signals can be 10 dB above the noise level.

In another embodiment, if the average power level of the environment or the ambient noise level is higher than a threshold value, signal amplification is reduced. This average power level can include the audio signals of the person talking to the user. The rationale is that if the environment is very noisy, it would be difficult for the user to hear the audio signals from the other person anyway. As a result, the system should not keep on amplifying the audio signals independent of the environment. For example, if the average power level of the environment is more than 75 dB, the amplification of the system is reduced, such as to 0 dB.

Another power management approach is to increase the power of the audio signals. One embodiment to create more power is to increase the surface area of the medium responsible for generating the output audio signals. For example, if audio signals are generated by a piezoelectric film, one can increase the surface area of the film to increase the power of the signals.

A number of embodiments are based on ultrasonic demodulation or mixing. To increase the output power of such embodiments, one can again increase the surface area of the medium generating the ultrasonic signals. As an example, a 1-cm diameter bimorph can give 140 dB ultrasonic SPL. The device may need about 0.1 W of input power. Ten such devices would increase output power by about 20 dB.

Another approach to increase power is to increase the demodulation or mixing efficiency of the ultrasonic signals by having at least a portion of the transformation performed in a medium other than air. Depending on the medium, this may make the directional speaker more power efficient. Such approaches have been described in the concurrently-filed application entitled, "DIRECTIONAL WIRELESS COMMUNICATION SYSTEMS."

The system (interface unit and/or the base unit) can include one or more rechargeable batteries. These batteries can be recharged by coupling the system to a battery charger. Another feature of the system that may be provided is one or more electrical connections on the system so as to facilitate electrical connection with a battery charger. For example, when the power source for the system is a rechargeable battery, the ability to charge the battery without removing the battery from the system is advantageous. Hence, in one embodiment, the system includes at least one connector or conductive element (e.g., terminal, pin, pad, trace, etc.) so that the electrical coupling between the rechargeable battery and the charger can be achieved. In this regard, the electrical connector or conductive element is provided on the system and electrically connected to the battery. The placement of the electrical connector or conductive element on the system serves to allow the system to be simply placed within a charger. Consequently, the electrical connector or conductive element can be in electrical contact with a counterpart or corresponding electrical connector or conductive element of the charger.

FIG. 5B shows an embodiment of the interface unit 150 with an electrical connection 152 and a cover 154. The interface unit 150 can be the interface unit 14 shown in FIG. 1. The electrical connection 152 can be a USB connector. With the cover 154 removed, the connection 152 can be used, for example, to couple to a battery charger to recharge a battery within the interface unit 150.

In one embodiment, the charger can be considered a docking station, upon which the system is docked so that the battery within the system can be charged. Hence, the system can likewise include an electrical connector or conductive element that facilitates electrical connection to the docking station when docked.

Figure 7:
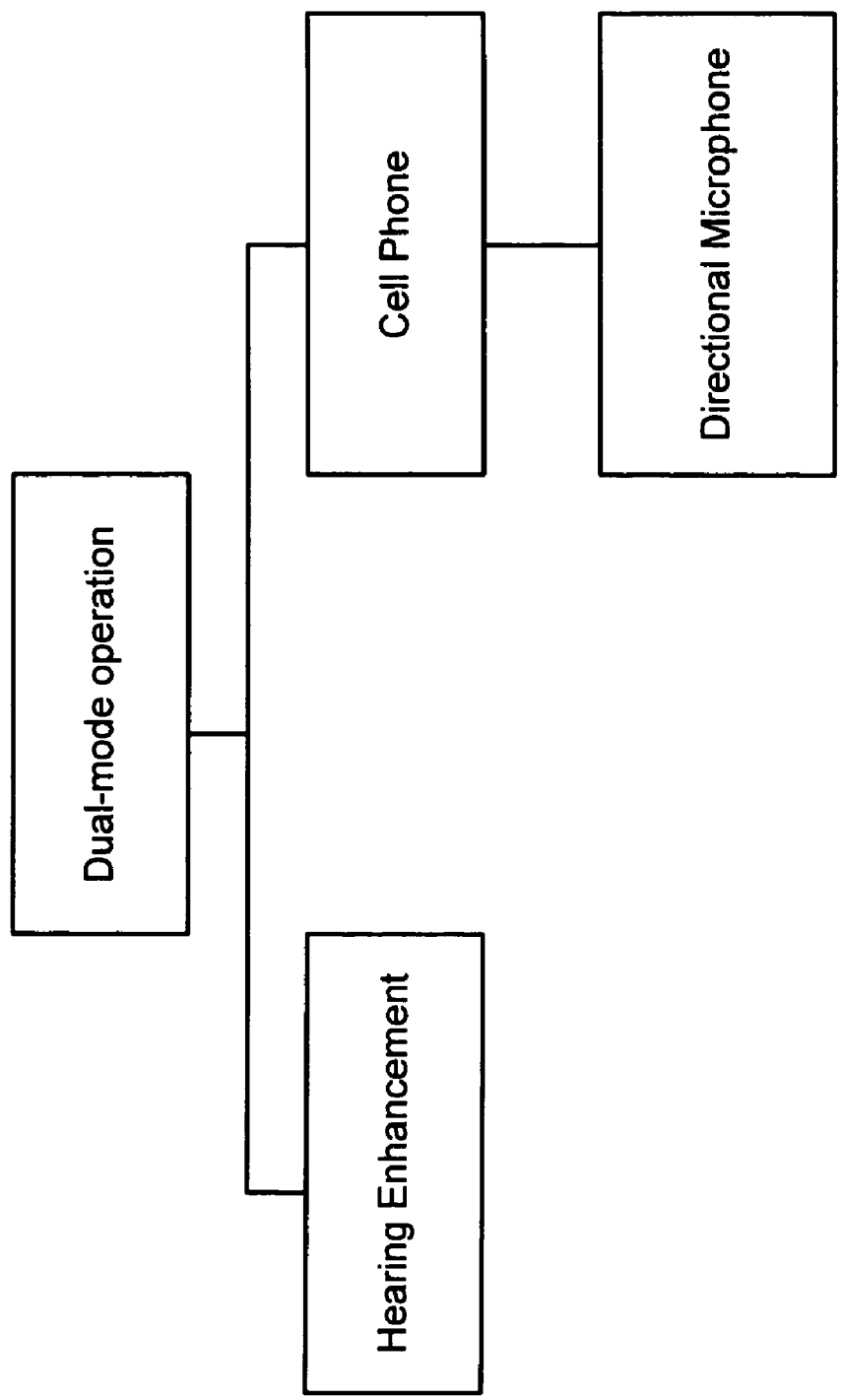
FIG. 7 shows embodiments of the present invention that can also function as a phone.

With the ear canal remaining open, the user can still use a phone directly. However, in one embodiment, the system, which can include the base unit, can also have the electronics to serve as a cell phone. FIG. 7 shows such an embodiment. When there is an incoming phone call, the system can change its mode of operation and function as a cell phone. The system can alert the user of an incoming call. This can be through, for example, ringing, vibration or a blinking light. The user can pick up the call by, for example, pushing a button on the interface unit. Picking up the call can also be through an activation mechanism on the base unit or a remote control device.

Figure 8:
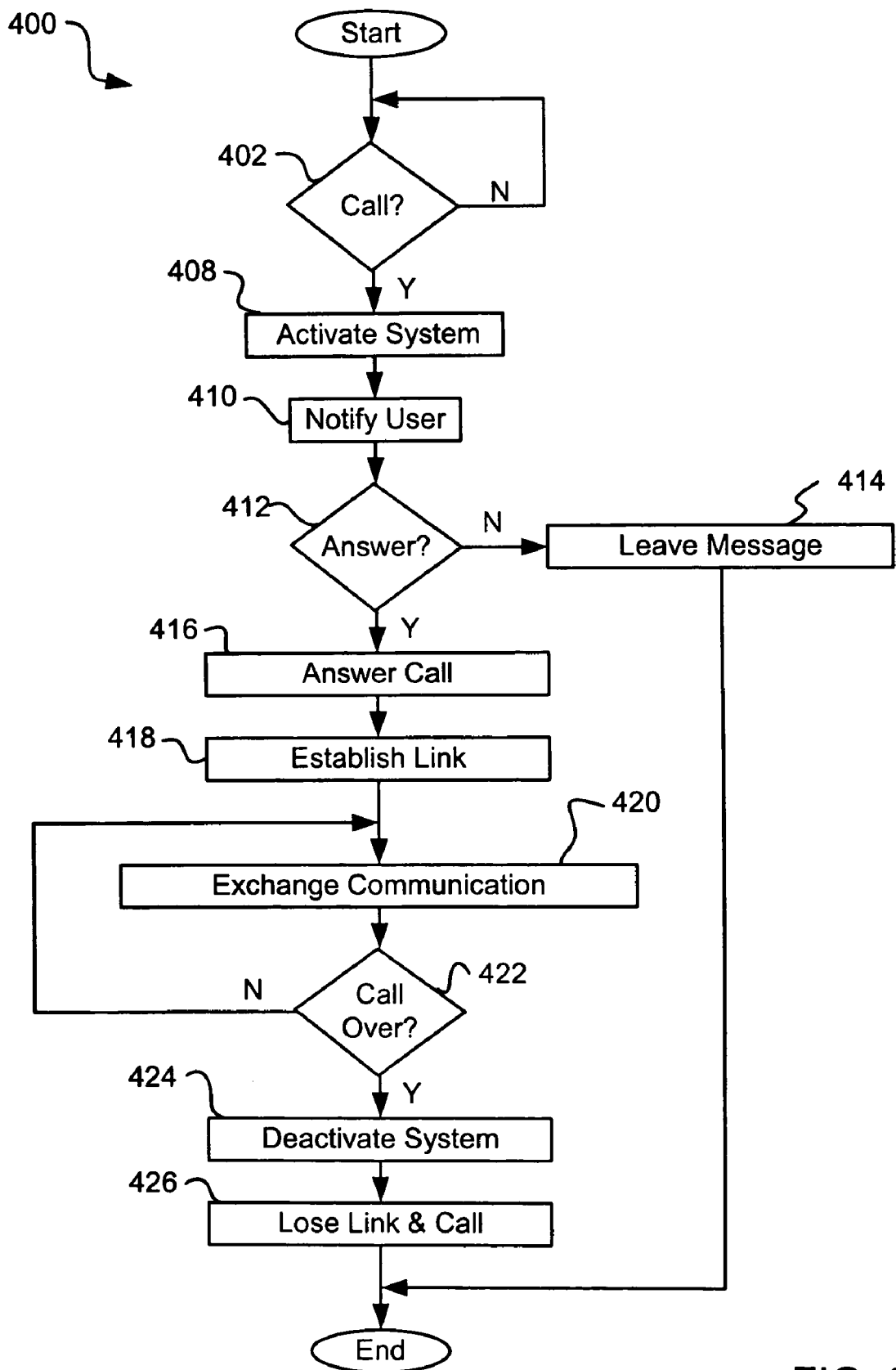
FIG. 8 is a flow diagram of call processing according to one embodiment of the invention.

FIG. 8 is a flow diagram of call processing 400 according to one embodiment of the invention. The call processing 400 is performed using the system. For example, the system can be the system shown in FIG. 1.

The call processing 400 begins with a decision 402 that determines whether a call is incoming. When the decision 402 determines that there is no incoming call, the call processing 400 waits for such a call. Once the decision 402 determines that a call is incoming, the system is activated 408. Here, the wireless communications capability of the system is activated (e.g., powered-up, enabled, or woken-up). The user of the system is then notified 410 of the incoming call. In one embodiment, the notification to the user of the incoming call can be achieved by an audio sound produced by the system (via a speaker). Alternatively, the user of the system could be notified by a vibration of the system, or a visual (e.g., light) indication provided by the system. The base unit could also include a ringer that provides audio sound and/or or vibration indication to signal an incoming call.

Next, a decision 412 determines whether the incoming call has been answered. When the decision 412 determines that the incoming call has not been answered, the base unit can activate 414 a voice message informing the caller to leave a message or instructing the caller as to the unavailability of the recipient.

On the other hand, when the decision 412 determines that the incoming call is to be answered, the call can be answered 416 at the base unit. Then, a wireless link is established 418 between the interface unit and the base unit. The wireless link is, for example, a radio communication link such as utilized with Bluetooth or WiFi networks. Thereafter, communication information associated with the call can be exchanged 420 over the wireless link. Here, the base unit receives the incoming call, and communicates wirelessly with the interface unit such that communication information is provided to the user via the system. The user of the system is accordingly able to communicate with the caller by way of the system and, thus, in a hands-free manner.

A decision 422 then determines whether the call is over (completed). When the decision 422 determines that the call is not over, the call processing 400 returns to repeat the operation 420 and subsequent operations so that the call can continue. On the other hand, when the decision 422 determines that the call is over, then the system is deactivated 424, and the wireless link and the call are ended 426. The deactivation 424 of the system can place the system in a reduced-power mode. For example, the deactivation 424 can power-down, disable, or sleep the wireless communication capabilities (e.g., circuitry) of the system. Following the operation 426, as well as following the operations 406 and 414, the call processing 400 for the particular call ends.

If the system also functions as a phone, the system can have a directional microphone pointing at the head of the user. One such embodiment is shown in FIG. 6A.

Operating the system as a phone can create different concerns as opposed to operating the unit as a hearing enhancement system. Since the audio signals are transmitted in an open environment, people in the user's immediate neighborhood might pick up some of the audio signals. If the SPL is 80 dB when the signals reach the user's head, signals reflected from the head can be 60 dB. Such a level may be heard by people in the immediate vicinity of the user. The user might not want people to pick up what he is hearing. In other words, the user may prefer more privacy.

Figure 9:
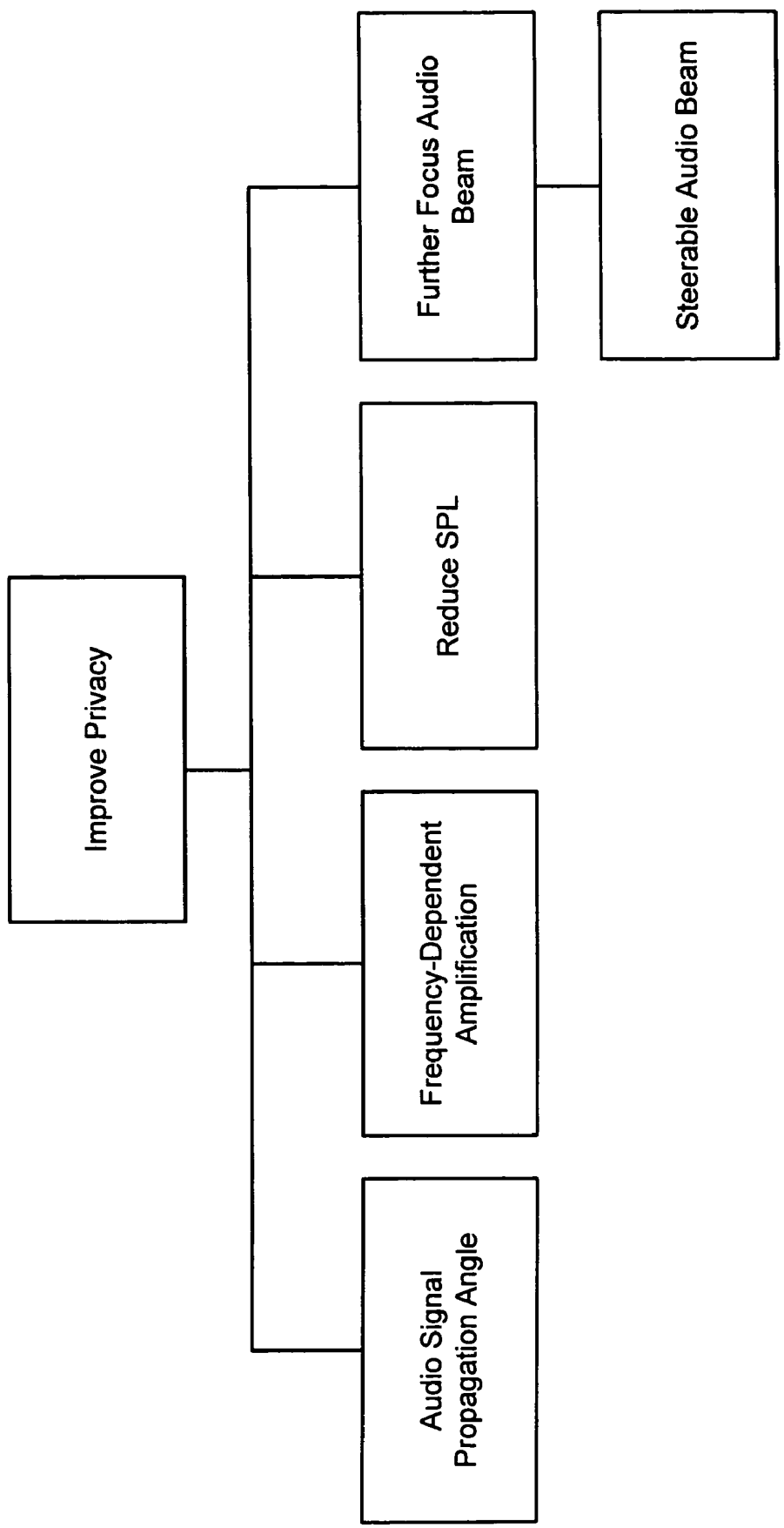
FIG. 9 shows a number of embodiments regarding improving privacy of the present invention.

FIG. 9 shows a number of embodiments regarding improving privacy of the present invention. The audio signal propagation angle can inherently improve privacy. The cone of the audio signals typically propagates from low to high in order to get to an ear of the user. For example, from the user's shoulder to an ear of the user, the elevation angle can be 45 degrees. One advantage of such a propagation direction is that most of the audio signals reflected from the head radiate towards the sky above the head. This reduces the chance of having the audio signals being eavesdropped particularly when the signal power is going down as the square of the propagation distance. Various other propagation directions can be utilized, as discussed in greater detail below.

Privacy can be enhanced based on frequency-dependent amplification. Since certain audio frequencies may not be amplified, and may be relatively low in SPL, their reflected signals can be very low. This reduces the probability of the entire audio signals being heard by others.

Another approach to improve privacy is to reduce the highest power level of the output audio signals to below a certain threshold, such as 70 dB. This level may be sufficient to improve the hearing of those who have mild hearing loss.

Yet another approach to enhance privacy is to further focus the beam of the audio signals. For the embodiment based on transforming ultrasonic frequencies, narrowing the cone can be done, for example, by increasing the carrier frequency of the audio signals. Typically, the higher the carrier frequency, the narrower the cone, such as a cone created by 100 kHz signals typically being narrower than a cone created by 40 kHz signals. Not only can the cone be narrowed, sidelobes can also be suppressed. Another approach to narrow the cone is to increase the gain of the cone or the horn that generates the audio signals.

A focused beam has the added advantage of better power conservation. With the audio signals restricted to a smaller cone, less power is needed to generate the audio signals.

In private, such as at home, hearing impaired people sometimes might have a tendency to increase the sound level of audio or video instruments a bit too high. On the other hand, in public, hearing impaired people sometimes might have difficulty hearing. In one embodiment, the system is further designed to pick up, capture or access audio signals from portable or non-portable instruments, with the interface unit serving as a personalized listening unit.

Audio signals from these instruments can be transmitted through wire to the system. The interface unit can provide an electrical input for connecting to the instrument by wires. If transmission is wireless, the system can be designed to include the electronics to capture wireless signals from the instruments through a wireless local area network, such as WiFi or Bluetooth. The audio signals from these instruments can be up-converted and transmitted as a WiFi signal to be picked up by the system. The system then down-converts the WiFi signal to re-generate the audio signals for the user.

Figure 10:
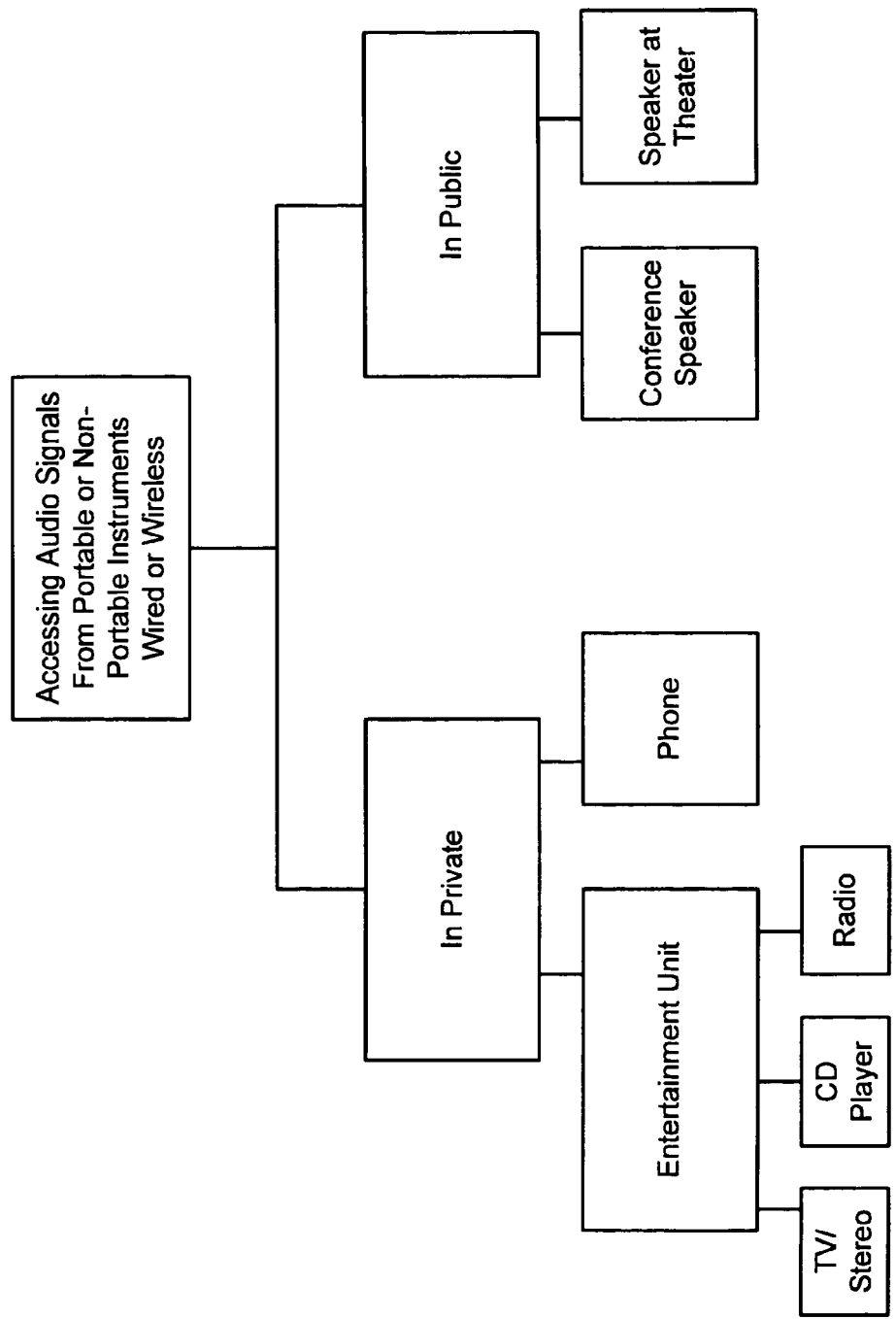
FIG. 10 shows a number of embodiments of the present invention accessing audio signals from other instruments wirelessly or through wired connection.
Figure 11:
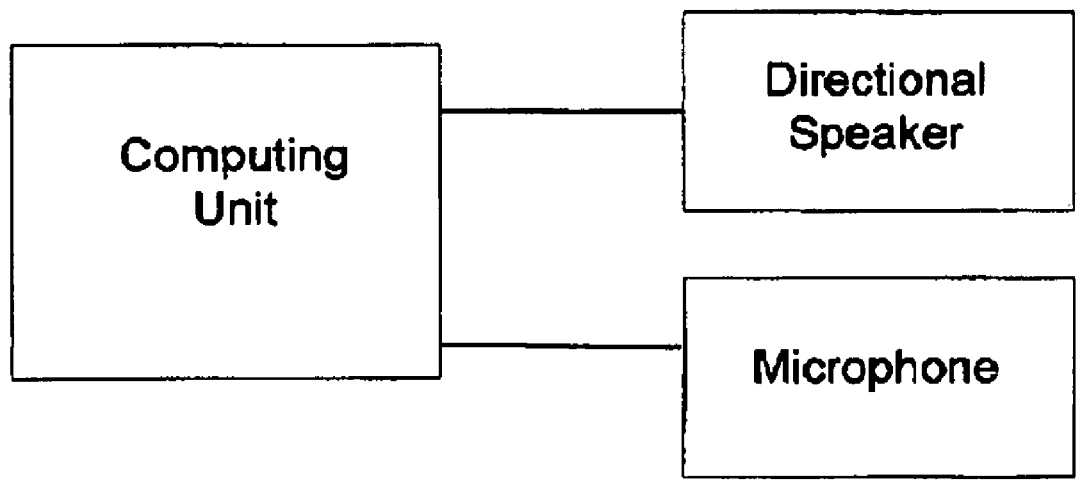
FIG. 11 shows a number of embodiments regarding a computing unit according to different embodiments of the invention.

FIG. 10 shows examples of such other portable or non-portable instruments. The instruments can be used in a private environment, such as at home, or attached to the user. This can include entertainment units, such as televisions, stereo systems, CD players, or radios. As an example, assume the user is working at the backyard and the stereo system is in the living room. Based on this technique, the user can enjoy the music without the need to crank up its volume. Private use can include a phone, which can be a desktop phone with a conference speaker or a cell phone. As yet another example, the system can function as the headset of a phone, and can be coupled to the phone in a wireless manner, such as through WiFi or Bluetooth.

Regarding public use, the user can be at a conference or a theater. The system can be coupled to the conference microphone or the theater speaker wirelessly, and thus be capable of capturing and enhancing the audio signals therefrom.

In a number of embodiments described, the directional speaker generates ultrasonic signals in the range of 40 kHz. One of the reasons to pick such a frequency is for power efficiency. However, to reduce leakage, cross talk or to enhance privacy, in other embodiments, the ultrasonic signals utilized can be between 200 kHz to 1 MHz. It can be generated by multilayer piezoelectric thin films, or other types of solid state devices. Since the carrier frequency is at a higher frequency range than 40 kHz, the absorption/attenuation coefficient by air is considerably higher. On the other hand, privacy is enhanced and audible interference to others is reduced.

A number of embodiments of directional speakers have also been described where the resultant propagation direction of the ultrasonic waves is not orthogonal to the horizontal, but at, for example, 45 degrees. The ultrasonic waves can be at an angle so that the main beam of the waves is approximately pointed at an ear of the user. In another embodiment, the propagation direction of the ultrasonic waves can be approximately orthogonal to the horizontal. Such a speaker does not have to be on a wedge or a step. It can be on a surface that is substantially parallel to the horizontal. For example, the speaker can be on the shoulder of a user, and the ultrasonic waves propagate upwards, instead of at an angle towards an ear of the user. If the ultrasonic power is sufficient, the waves would have sufficient acoustic power even when the speaker is not pointing exactly at the ear.

In one embodiment, the ultrasonic beam is considered directed towards the ear as long as any portion of the beam, or the cone of the beam, is immediately proximate to, such as within 7 cm of, the ear. The direction of the beam does not have to be pointed at the ear. It can even be orthogonal to the ear, such as propagating up from one's shoulder, substantially parallel to the face of the person.

The advantages of the invention are numerous. Different embodiments or implementations may yield different advantages. Different embodiments of the invention can provide one or more of the following advantages: (a) users are provided with non-invasive, hands-free wireless communications capability; (b) the user's ear remains free from any inserted objects and thus is free from the annoying occlusion effects, enabling the user to continue to hear sounds without interference; (c) the system can be inconspicuous due to its relatively small form factor, such as 2" by 3"; (d) the system can be inconspicuous, and would not be seen as a hearing enhancing device because it can be mistaken as a cell phone; (e) the system would not create feedback and resonance due to misalignment in its positioning as in many of the existing hearing aids; (f) the system can have a shape easy to adapt to the profile of a human being, such as in a shape comfortably residing on the shoulder of a user; (g) the system is relatively inexpensive, compared to existing hearing aids—this can, for example, be due to the lack of requiring an individually-fitted ear mold; and (h) the system is relatively easy to handle, such as to change or to recharge batteries, depending on the embodiment.

A number of embodiments have been described where a device is attachable to the clothing worn by a user. In one embodiment, attachable to the clothing worn by a user includes wearable by the user. For example, the user can wear a speaker on his neck, like a pendant on a necklace. This also would be considered as attachable to the clothing worn by the user. From another perspective, the necklace can be considered as the "clothing" worn by the user, and the device is attachable to the necklace.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. A number of embodiments of the invention can also be embodied as computer readable code on a computer readable medium. The computer readable medium is any data storage device that can store data, which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the invention. However, it will be understood by those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A hearing enhancement system for a user, comprising:
    an interface unit that has a directional speaker and a microphone; wherein
    the microphone receives input audio signals, which are transformed into ultrasonic signals,
    the speaker transmits the ultrasonic signals,
    at least a portion of the ultrasonic signals is transformed into output audio signals in air,
    a portion of the output audio signals is amplified more than another portion to enhance the hearing of the user, and
    wherein the directional speaker is configured to be spaced apart from at least one of the ears of the user so that at least a portion of the ultrasonic signals is transformed into output audio signals outside the at least one of the ears of the user, to be received by the at least one of the ears of the user.

2. A hearing enhancement system as recited in claim 1 wherein the amplification is frequency dependent.

3. A hearing enhancement system as recited in claim 2 wherein certain frequencies of the input audio signals are not amplified.

4. A hearing enhancement system as recited in claim 2 wherein the amplification depends on at least one characteristic of the hearing of the user.

5. A hearing enhancement system as recited in claim 4,
    wherein the at least one characteristic of the hearing of the user is determined through calibrating the hearing of the user,
    wherein the system is configured to allow the amplification to be changed as a function of frequency, and
    wherein the user can change the amplification in view of the calibration results.

6. A hearing enhancement system as recited in claim 2 wherein at least a portion of the audio frequencies that is higher in frequency than another portion of the audio frequencies receives greater amplification.

7. A hearing enhancement system as recited in claim 1 wherein the system can be de-activated by the user.

8. A hearing enhancement system as recited in claim 1 wherein when the system is not activated, the system can be activated depending on at least one word spoken by the user.

9. A hearing enhancement system as recited in claim 1 wherein the input audio signals have a power level, and wherein depending on the power level of the input audio signals, the system can be in a standby mode.

10. A hearing enhancement system as recited in claim 1 wherein the input audio signals have an average power level, and wherein depending on the average power level of the input audio signals, the system can be in a standby mode.

11. A hearing enhancement system as recited in claim 1 wherein the microphone is a directional microphone.

12. A hearing enhancement system as recited in claim 1 wherein the input audio signals have an average power level, and wherein the amplification is reduced or limited if the average power level of the input audio signals is higher than a preset threshold.

13. A hearing enhancement system as recited in claim 1 wherein the system further includes a rechargeable battery.

14. A hearing enhancement system as recited in claim 1 wherein the system also can function as a phone.

15. A hearing enhancement system as recited in claim 1, wherein the system includes more than one directional speaker, wherein the phases of the ultrasonic signals driving at least two of the speakers differ by a preset value, and wherein the direction of the output audio signals can be changed by changing the preset value.

16. A hearing enhancement system as recited in claim 1 wherein the system can also access audio signals from another instrument through a wire or a wireless connection.

17. A hearing enhancement system as recited in claim 16 wherein the another instrument is a portable instrument.

18. A hearing enhancement system as recited in claim 16 wherein the another instrument is an entertainment unit.

19. A hearing enhancement system as recited in claim 16 wherein the another instrument is a phone.

20. A hearing enhancement system as recited in claim 16, wherein the another instrument is a microphone at an event, and wherein audio signals are accessed from another instrument through a wireless connection.

21. A hearing enhancement system as recited in claim 16, wherein the another instrument is a speaker at an event, and wherein audio signals are accessed from another instrument through a wireless connection.

22. A hearing enhancement system as recited in claim 1, wherein the amplification is frequency dependent, wherein the amplification depends on at least one characteristic of the hearing of the user, wherein the at least one characteristic of the hearing of the user is determined through calibrating the hearing of the user, wherein the system is configured to allow the amplification to be changed as a function of frequency, wherein the system can be in a standby mode to reduce power consumption by the system, wherein the system further includes a rechargeable battery, and wherein the system also can function as a phone.

23. A hearing enhancement system for a user, comprising:

a directional speaker, a microphone; and a computing unit operatively coupled to the directional speaker and the microphone, wherein the microphone receives input audio signals, wherein the directional speaker outputs ultrasonic waves based on the input audio signals, wherein the directional speaker is configured to be spaced apart from at least one of the ears of the user so that at least a portion of the ultrasonic signals is transformed into output audio signals outside the at least one of the ears of the user, to be received by the at least one of the ears of the user, and wherein the computing unit is configured to modify the output audio signals at least by modifying certain frequencies differently than other frequencies to enhance the hearing of the user.

24. A hearing enhancement system as recited in claim 23, wherein the speaker is attachable to the clothing worn by the user, and wherein the directional speaker can direct the ultrasonic waves towards at least one ear of the user from the worn position of the directional speaker.

25. A hearing enhancement system as recited in claim 23, wherein the computing unit is integral with the directional speaker.

26. A hearing enhancement system as recited in claim 23, wherein the computing unit is separate from the directional speaker but operatively couples with the directional speaker over a wireless link.

27. A hearing enhancement system as recited in claim 23, wherein the computing unit has a reduced power mode and a normal power mode, and wherein the computing unit can be automatically switched between the power modes based on at least one characteristic of the input audio signals, thereby reducing power consumption by the computing unit.

* * * * *

UNITED STATES PATENT AND TRADEMARK OFFICE
CERTIFICATE OF CORRECTION

PATENT NO.        : 7,388,962 B2
APPLICATION NO.   : 10/826527
DATED             : June 17, 2008
INVENTOR(S)       : Cheung et al.

It is certified that error appears in the above-identified patent and that said Letters Patent is hereby corrected as shown below:

IN THE CLAIMS:

Column 14, line 33 (claim 1, line 9) "output audio signals is amplified more" should be
--output audio signals is configured to have higher power--

Column 14, line 65 (claim 2, line 2) "wherein the amplification is frequency dependent" should be
--wherein the portion having higher power is selected based on frequency--

Column 14, line 46 (claim 3, line 2) "wherein certain frequencies of the input audio signals are not amplified" should be
--wherein the interface unit is configured not to increase the power of certain frequencies of the output audio signals--

Column 14, line 49 (claim 4, line 2) "wherein the amplification depends on" should be
--wherein the power increase depends on--

Column 14, line 55 (claim 5, line 5) "allow the amplification to be changed" should be
--allow the power of the output audio signals to be changed--

Column 14, line 57 (claim 5, line 7) "can change the amplification in view" should be
--can change the power in view--

Column 14, line 61 (claim 6, line 3) "higher in frequency than another" should be
--higher in frequency is selected over another--

Column 14, line 62 (claim 6, line 4) "frequencies receives greater amplification" should be
--frequencies to have higher power--

Column 15, line 16 (claim 12, line 4) "wherein the amplification is reduced" should be
--wherein the power of the portion is reduced--

UNITED STATES PATENT AND TRADEMARK OFFICE
CERTIFICATE OF CORRECTION

PATENT NO. : 7,388,962 B2
APPLICATION NO. : 10/826527
DATED : June 17, 2008
INVENTOR(S) : Cheung et al.

It is certified that error appears in the above-identified patent and that said Letters Patent is hereby corrected as shown below:

Column 16, line 27 (claim 23, line 15) "unit is configured to modify the output audio signals at least by modifying certain frequencies differently" should be
--unit is configured so that at least certain frequencies of the output audio signals are being modified differently--

Signed and Sealed this

Seventh Day of July, 2009

JOHN DOLL
*Acting Director of the United States Patent and Trademark Office*